United States Patent
Hovde

(10) Patent No.: US 8,985,906 B2
(45) Date of Patent: Mar. 24, 2015

(54) ASSEMBLY FOR CONNECTION OF A FLEXIBLE TUBULAR PIPE TO AN UNDERSEA INSTALLATION

(75) Inventor: Geir Olav Hovde, His (NO)

(73) Assignees: Technip France (FR); Advanced Production and Loading AS (NO)

(*) Notice: Subject to any disclaimer, the term of this patent is extended or adjusted under 35 U.S.C. 154(b) by 0 days.

(21) Appl. No.: 13/513,093

(22) PCT Filed: Nov. 30, 2010

(86) PCT No.: PCT/FR2010/052569
§ 371 (c)(1),
(2), (4) Date: Jun. 20, 2012

(87) PCT Pub. No.: WO2011/067529
PCT Pub. Date: Jun. 9, 2011

(65) Prior Publication Data
US 2012/0263542 A1    Oct. 18, 2012

(30) Foreign Application Priority Data
Dec. 4, 2009  (FR) ..................... 09 58664

(51) Int. Cl.
*E21B 17/01* (2006.01)
*F16L 1/26* (2006.01)

(52) U.S. Cl.
CPC ............ *E21B 17/015* (2013.01); *E21B 17/017* (2013.01); *F16L 1/26* (2013.01)
USPC ....................................... 405/172; 405/184.4

(58) Field of Classification Search
CPC ................ F16L 1/12; F16L 1/14; F16L 1/16; F16L 1/20; E21B 17/01; E21B 17/015; E21B 17/017
USPC ........ 405/158, 168.1, 171, 172, 184.4, 184.5, 405/224.3
See application file for complete search history.

(56) References Cited

U.S. PATENT DOCUMENTS

| 3,602,174 A * | 8/1971 | Gorman .................... 114/293 |
| 4,310,263 A | 1/1982 | Daughtry |
| 5,437,518 A * | 8/1995 | Maloberti et al. ............ 405/169 |
| 2004/0026081 A1 | 2/2004 | Horton, III |
| 2004/0244984 A1 | 12/2004 | Kjelland-Fosterud |
| 2005/0196243 A1 | 9/2005 | Pollock et al. |
| 2006/0159521 A1 | 7/2006 | Streiff et al. |

FOREIGN PATENT DOCUMENTS

WO     WO 99/66169 A2    12/1999

OTHER PUBLICATIONS

French Search Report dated Jul. 14, 2010 issued in corresponding French patent application No. FR 0958664.

* cited by examiner

*Primary Examiner* — Benjamin Fiorello
(74) *Attorney, Agent, or Firm* — Ostrolenk Faber LLP

(57) ABSTRACT

An assembly for connecting a flexible line (20) to an underwater installation (18). The line is extended between the underwater installation (18) and a surface installation (16). The line (20) includes (i) a surface end (22), a bottom end (28) (ii) a contact portion (26) near the bottom end and a floating portion (24) which extends between the contact portion (26) and the surface end (22). The contact portion (26) includes an angled part (40) that divides the contact portion (26) into a first part (36) and a second part. Then angled part (40) is moored to the bottom (10) at an anchoring point (42) located in the opposite direction from both the bottom end (28) and the floating portion (24).

12 Claims, 1 Drawing Sheet

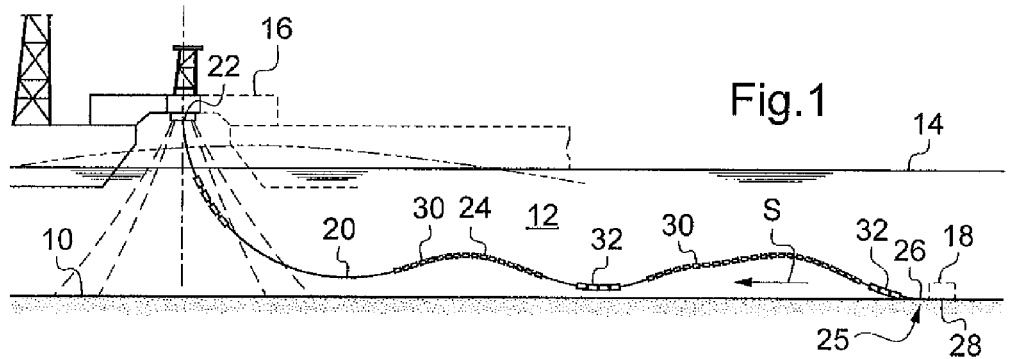
Fig.1
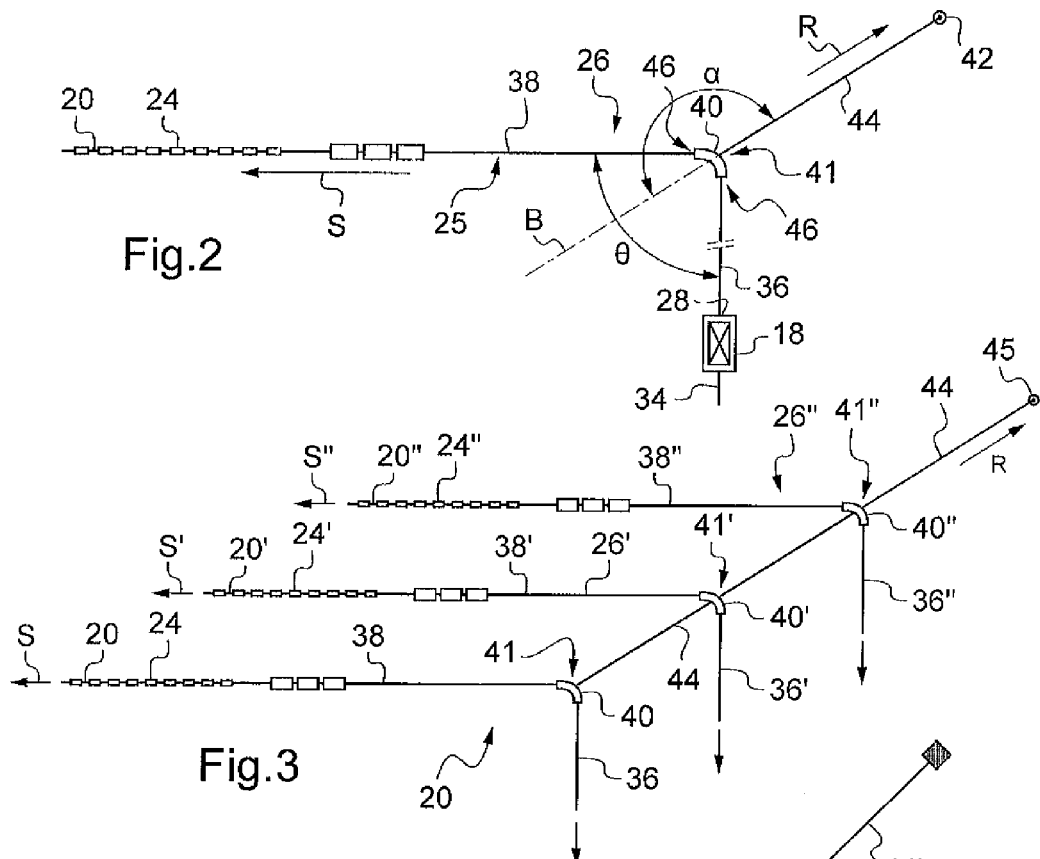
Fig.2
Fig.3
Fig.4

ASSEMBLY FOR CONNECTION OF A FLEXIBLE TUBULAR PIPE TO AN UNDERSEA INSTALLATION

CROSS-REFERENCE TO RELATED APPLICATIONS

The present application is a 35 U.S.C. §§371 national phase conversion of PCT/FR2010/052569, filed Nov. 30, 2010, which claims priority of French Application No. 0958664, filed Dec. 4, 2009, the contents of which are incorporated by reference herein. The PCT International Application was published in the French language.

BACKGROUND AND SUMMARY OF THE INVENTION

The present invention relates to an assembly for connection of a flexible tubular pipe to an undersea installation in order to transport liquid and/or gaseous hydrocarbons, for example liquefied natural gas or water.

The extraction and transport of these fluids in a marine environment requires an undersea installation at the bottom of the sea, and an overlying surface installation, such as to be able to recuperate the hydrocarbons by means of a flexible tubular pipe which extends between the undersea installation and the surface installation.

This flexible pipe is advantageously of the unbonded type, and is described in the standardizing documents published by the American Petroleum Institute API 17 J and API RP 17B. Without departing from the scope of the invention, the flexible pipe could be a flexible pipe of the bonded type, or a power or control umbilical unit for example. Also, the invention is not limited to a flexible pipe, but also extends to a bundle of flexible pipes. The undersea installation can for example be a well head or a connection of the FLET or PLET type.

The surface installation is subjected to movements of swell, currents and wind, thus involving displacement of the surface installation both in the horizontal direction and in the vertical direction. These movements of the surface installation added to the currents are transmitted to the flexible tubular pipe and are propagated along the pipe, consequently generating movements and deformations of the flexible tubular pipe. The pipe comprises a floating portion between the surface and the bottom, and a contact portion, the latter comprising a zone of contact of the flexible tubular pipe with the bottom of the sea (touch down zone or TDZ), with the position of the contact zone TDZ being displaced according to these movements, and in particular those of the surface installation. At the level of the contact zone, the contact portion has curvature, and then continues its course along the bottom of the sea towards the undersea installation. The movements which are transmitted to the flexible tubular pipe can be propagated as far as the contact zone or TDZ and generate significant deformations of the flexible pipe, such that the torsion or flexure of the pipe can result in compression of the flexible pipe at the bottom, or even crush the pipe. Also, these movements and deformations of the pipe exert significant forces on the pipe in contact with the bottom of the sea, particularly at the level of the contact zone (TDZ), which can lead to deterioration of the intactness of the flexible pipe.

In order to limit the forces which are exerted on the pipe at the level of the contact zone, different configurations of flexible pipe exist, to uncouple the movements of the surface installation from those of the pipe at the level of the TDZ.

In situations in which the sea is shallow, or there is a shoal, typically where the level is less than 100 meters relative to the bottom of the sea, the flexible tubular pipe configurations generally have long excess lengths in order to accommodate the movements which are transmitted to the flexible pipe. According to the movements of the surface installation and the currents, the flexible pipe is deformed and displaced so as to absorb these forces.

A typical configuration for shallow seas is that in which the flexible tubular pipe, which has two opposite ends, one connected to the undersea installation and the other connected to the surface installation, is equipped between the two with undersea buoys and heavy modules which form ballasts. The undersea buoys make it possible to form a floating portion of flexible tubular pipe, which is thus maintained between the bottom of the sea and the surface, and describes two curves with concavity which faces towards the bottom, whereas, in particular in the vicinity of the undersea installation, the heavy modules make it possible to maintain a contact portion of the tubular pipe in contact with the bottom of the sea. This configuration is commonly known as the double wave configuration.

Reference can be made in particular to document US 2006/0159 521, which shows an installation in which the flexible tubular pipe is equipped with undersea protection at the level of the zones of contact with the bottom of the sea.

Thus, under the effect of the movements of the surface installation and the currents, the floating portion of flexible tubular pipe, which is retained by the surface end connected to the surface installation, is moved and deformed so as to accommodate these movements and to dissipate at least partially the forces which are transmitted at the level of the contact zones. When the meteorological conditions deteriorate and the surface installation is moved relative to the undersea installation with high amplitudes, typically of approximately the height of a wave for example, and at high frequencies, in its so-called double wave configuration the flexible pipe is no longer sufficient to avoid the strong stresses on the pipe at the level of its zones of contact with the bottom of the sea.

Consequently, a problem which arises, and which the present invention aims to solve, consists of providing an assembly for connection of a flexible pipe to an undersea installation in a shallow sea, which makes it possible to protect the undersea installation when the meteorological conditions have deteriorated and the sea is rough.

Another problem which the invention aims to solve is that of providing an assembly for connection of a flexible pipe to an undersea installation, which makes it possible to protect the flexible tubular pipe at the level of the contact zone, by dissipating the forces transmitted at the level of the contact zone (TDZ).

Yet another objective of the invention is to control the excessive displacements of the pipe when the sea is rough.

SUMMARY OF THE INVENTION

In order to solve this problem, the present invention proposes an assembly for connection of at least one flexible pipe to an undersea installation laid on the bottom of a marine environment, said flexible pipe being designed to extend between said undersea installation and a surface installation which emerges on the surface of said marine environment, said flexible pipe having firstly a surface end which is opposite a bottom end, and secondly a contact portion which is situated close to said bottom end, and a floating portion which extends between said contact portion and said surface end, said surface end and said bottom end being designed respectively to be connected to said surface installation and said undersea installation, whereas said contact portion comes into contact with said bottom in the vicinity of said undersea installation, and said floating portion extends between said bottom and said surface, said floating portion being able to exert traction forces on said contact portion. According to the invention, said contact portion comprises a curved part, said curved part dividing said contact portion into a first part which is oriented towards said bottom installation, and a second part which links up with said floating portion; and said curved portion is anchored to said bottom at an anchorage point opposite both said bottom end and said floating portion, such as to maintain said first and second parts substantially parallel to said base, and so as to absorb said traction forces exerted by said floating portion on said contact portion.

Thus, a characteristic of the invention consists in implementation of the contact portion by forming a curved part, and in anchoring this curved part in a direction substantially opposite the floating portion of pipe, such as to absorb the traction forces which are exerted by this floating portion. By this means, the undersea installation is subjected to far less stress, since the first part of contact portion which links up with the undersea installation to which it is connected by means of the bottom end, is itself protected against the traction forces which are exerted by the floating portion of pipe.

In addition, when the forces which are transmitted by the floating portion are propagated in the contact portion towards the contact zone (TDZ), the amplitude of the movements of said contact zone is attenuated, since the forces are absorbed by the anchorage. The anchorage advantageously consists of flexible mooring, for example an anchorage line, a first end of which is connected to the curved part, and the second end of which is anchored to the bottom of the sea, at a distance from the curved part. The mooring thus extends on a plane which is substantially parallel to the bottom of the sea. By this means the forces of the floating portion are transmitted to the mooring by means of the second part of contact portion and by the curved part. The forces which impart vertical movement to the second part of contact portion are thus dissipated via the mooring, which itself is moved vertically, but pivots around its anchorage point. This therefore prevents any phenomenon of deformation of the pipe in the contact zone (TDZ) such as compression, crushing, torsion or flexure.

Said curved part has a lower surface opposite an upper surface, and advantageously said curved part is moored on said upper surface side, whereas the first and second parts of contact portion are oriented in an opposite direction. In addition, said curved part is advantageously rigid, such as to obtain a constant curvature at the level of the curved part. Also, it is easier to moor the curved part to an anchorage point on the bottom of the sea if it is rigid.

Said curved part has two connection ends opposite one another, said two connection ends being connected respectively to said first and second parts of said contact portion, and, advantageously, each connection end is equipped with a stiffening sheath. The latter makes it possible to limit the movement of the first and second parts of contact portion in the vicinity of the curved part, and consequently to limit their radii of curvature, and thus protect them.

In addition, according to an advantageous characteristic, said contact portion is equipped with heavy modules in order to maintain said contact portion on said bottom. The nature of the bottom of the sea can vary from one environment to another: it is sometimes covered with silt, and therefore the heavy modules make it possible to maintain the contact portion substantially parallel to the mean plane defined by the bottom of the sea.

According to a particularly advantageous embodiment of the invention, said curved part is moored to said anchorage point by mooring which is oriented relative to said second part of contact portion and relative to said first part of contact portion according to angles which are between 90° and 180°. Preferably, the angle which is formed by the mooring and the second part of contact portion which is extended by the floating portion of pipe is between 120° and 150°, whereas the angle formed by the mooring and the first part of contact portion is between 150° and 120°. Thus, the mooring absorbs part of the forces transmitted by the contact portion. Also, this configuration makes it possible to maintain the tension according to a longitudinal direction of this first part of contact portion which is flexible, and participates in controlling excessive displacements of the pipe relative to its nominal position.

According to a particularly advantageous characteristic, said curved part is moored to said anchorage point by extensible mooring. Thus, the mooring makes it possible to damp and dissipate the traction forces which are exerted by the floating portion of flexible pipe on the contact portion, in particular when the floating portion imparts strong acceleration to the contact portion. Preferably, said mooring is made of a material comprising polymer fibers. Thus, the mooring is produced at a relatively advantageous cost. In addition the polymer fibers are relatively resistant to the marine environment, and there are many materials which have wide ranges of extensibility.

According to a particularly advantageous variant of the invention, said mooring is connected, between said one curved part and said anchorage point, to another curved part of another contact portion of another flexible pipe. Consequently, by means of implementation of a single mooring, it is possible to maintain a plurality of curved parts, and consequently to connect a plurality of flexible pipes to the undersea installation. Advantageously, said other contact portion has another first part and another second part, which are respectively substantially parallel to said first and second parts. Thus, the contact portions can easily be maintained parallel to one another without risk of intermingling at the level of the bottom of the sea.

BRIEF DESCRIPTION OF THE DRAWINGS

Other specific features and advantages of the invention will become apparent from reading the following description of particular embodiments of the invention, provided by way of non-limiting indication, with reference to the attached drawings, in which:

BRIEF DESCRIPTION OF THE DRAWINGS

FIG. 1 is a schematic view in vertical cross-section of a connection assembly according to the invention;

FIG. 2 is a schematic view from above and in detail of the connection assembly illustrated in FIG. 1, according to a first variant of execution;

FIG. 3 is a schematic view from above and in detail of the connection assembly illustrated in FIG. 1, according to a second variant of execution; and FIG. 4 is a schematic view from above and in detail of the connection assembly according to another embodiment.

DESCRIPTION OF PREFERRED EMBODIMENTS

FIG. 1 shows a marine environment with the bottom of the sea 10, a depth of water 12 and a surface of the sea 14. The depth of water is shallow, i.e. less than 100 meters, for example less than 50 meters, and preferably between 30 and 45 meters. In addition, a surface installation 16 floats on the surface of the sea 14, and an undersea installation 18, which is represented in broken lines, rests on the bottom of the sea 10. A flexible tubular pipe 20 extends between the two. The latter has, going from the surface installation 16 towards the undersea installation 18, a surface end 22 which is connected to the surface installation 16, a floating portion 24 which extends between the bottom of the sea 10 and the surface of the sea 14, substantially parallel to the bottom of the sea, and a contact portion 26 which ends in a bottom end 28 which will be described hereinafter with reference to FIG. 2. The contact portion 26 has a contact zone 25 or point of contact with the bottom of the sea 10. The floating portion 24 is provided with a succession of undersea buoys 30 which alternate with heavy modules 32, and provide the floating portion 24 with undulations.

At least one series of buoys is necessary in order to impose undulation on the floating portion and provide it with an excess length. However, the number of these concavities, their orientation and the arrangement of the assemblies of buoys and their dead weight, can be variable, and can easily be determined by persons skilled in the art according to different parameters such as the swell conditions or the configuration of the field.

In addition, the heavy modules 32, which are situated in the contact portion 26, allow the pipe to come into contact with the bottom of the sea 10, substantially parallel to the latter. By way of example, for a centenary swell, which is also known as centennial, with a significant height which is assumed to be between 10 and 15 meters (regularity 10-11 s) in a depth of water of between 43 and 45 meters, the length of the floating portion 24 can be between 100 and 170 meters, and the length of the contact portion 26 can be between 50 and 100 meters.

It can thus be understood that the movements of the surface installation 16 and of the sea currents, not only in a vertical direction caused by the swell, but also in a horizontal direction, are transmitted to the floating portion, and are propagated along the entire flexible pipe 20, and these forces are dissipated in the contact portion 26.

Reference is made to FIG. 2 in order to describe in greater detail the connection assembly which is the subject of the invention, and makes it possible specifically to absorb these traction forces so that they do not generate any irreversible deformations of the contact zone 25 by compression, crushing, torsion or flexure of the assembly. FIG. 2 shows from above the contact portion 26 of the flexible tubular pipe 20 which ends with its bottom end 28, and the undersea installation 18 to which it is connected. By way of example, the contact portion will measure between 50 and 100 m. In this case, the undersea installation 18 represents an installation for receipt of a rigid pipe 34 coming from the source of petroleum.

Said contact portion 26, which is an extension of the flexible tubular pipe 20, and is consequently of the same nature as the pipe, has two parts 36, 38 which are separated by a curved part 40. This curved part 40 has an upper surface 41, and is connected to an anchorage point 42 which is situated at a distance, by means of mooring 44 on its upper surface side 41. The mooring thus extends substantially on a plane which is parallel to the bottom of the sea. According to a first embodiment, the curved part 40 of the contact portion 26 is formed by a sleeve of articulated vertebrae which make it possible to limit the curvature of the contact portion 26 which passes through it with a minimum radius of curvature. However, it could be envisaged to provide a rigid sleeve formed by a curved steel pipe, which would have an inner diameter substantially the same as the outer diameter of the flexible pipe 20.

According to another preferred embodiment, the curved part 40 is constituted by a rigid steel curve 40, whereas the contact portion 26 is divided into two half-portions, which are connected respectively to the two opposite ends of the rigid curve. According to this other embodiment, the two opposite ends of the rigid curve are equipped respectively with a stiffening sheath 46 or bending stiffener, which assures the transition of rigidity between the rigid steel curve 40 and the portions of flexible contact pipe. It can also be envisaged to replace the stiffening sheath by a pipe of the bell mouth type.

On the mean plane constituted by the two parts 36, 38 of the contact portion 26, which are joined by the curved part 40, these two parts 36, 38 are spaced by an angle θ of less than 180° (and greater than the minimum radius of curvature of the flexible pipe, if the curved portion is constituted by a flexible pipe of the unbonded type). Preferably the angle θ is between 90° and 120°.

The anchorage point 42 is situated at a distance from the curved part 40 in a direction opposite the floating portion 24 of the flexible pipe 20, and also in a direction opposite the bottom end 28. The mooring 44 thus extends spaced from the curved portion, whilst defining an open angle α together with the second part of the contact portion 26, which for example is between 90 and 170° C.

In FIG. 2, the curved portion has an angle θ of 90°, and the mooring extends substantially according to a direction which is combined with the bisector B formed by the two parts 36, 38 of the contact portion 26, i.e. by forming an angle α of 135°. FIG. 4 illustrates another embodiment of the invention, where the equivalents of the elements shown in FIG. 2 have the same reference, allocated with a primed sign "'". Thus, the curved part 40' in this case forms an angle greater than 90°, i.e. 120°, and the mooring 44' is not combined with the bisector, but forms an angle α of 100°.

However, it is advisable for the mooring 44' to extend in the direction which is combined with the bisector formed by the two parts of contact portion 36' and 38'. This makes it possible to stabilize the lateral displacements of the curved part 40 during the dynamic movements of the flexible pipe 20.

FIG. 2 shows a particular embodiment in which the contact portion 26 has two parts 38, 36, such that the zone of contact 25 of the floating pipe 24 with the bottom of the sea 10 (TDZ) and the curved part 40 are spaced, and are connected by the part 38 of the contact portion 26. The latter is therefore several tens of meters long. This embodiment is particularly advantageous, since the part 38 of the contact portion 26 contributes towards accommodating deformations of the pipe by rising, which tends to displace the contact zone 25. However, the possibility is not excluded of providing a very short length of part 38, for example of approximately a meter, such that the curved portion is substantially combined with the contact zone (TDZ).

DETAILED DESCRIPTION

These two parts 36, 38 of contact portion 26 have a first part 36 which is oriented towards the bottom installation 18, and a second part 38 which is oriented towards the floating portion 24 which it extends. In periods when the sea is rough, the movements of the surface installation added to the currents give rise to displacements and deformations of the floating flexible pipe 20 which are transmitted along the contact portion 26 and are dissipated substantially in the assembly constituted by the mooring 44 and the curved part 40.

The mooring 44 absorbs a substantial part R of these forces transmitted to the pipe, by means of the curved part 40, a substantial part R of these traction forces.

The mooring 44 is in this case supported in a tension position, such as to draw out the floating portion 24 of flexible tubular pipe 20 which forms undulations, and also such as to subject the first part 36 of contact portion 26 to tension, in order to impart to it a longitudinal form. This deformable and flexible arrangement constituted by the mooring 44 and the curved part 40 makes it possible to dissipate the forces transmitted in the flexible pipe, and to maintain the contact zone 25 (TDZ). In particular, the risks of compression of the pipe at the foot of the pipe are avoided.

In addition, the mooring 44 is made of an extensible material of the braided polymer fiber type, for example of polyester. Thus, the mooring 44 is also resiliently deformable. Consequently, when the intensity of the traction forces which are exerted on the second part 38 by means of the floating portion 24 varies, the mooring 44 is deformed accordingly, and substantially damps these traction forces.

Reference is now made to FIG. 3, which illustrates another variant embodiment of the invention, in which the connection assembly makes it possible to connect three flexible pipes. The three identical elements will have an identical reference, to which there has been allocated respectively the primed sign "'" and the double primed sign "''". Thus, this FIG. 3 shows the mooring 44 connected to its anchorage point 42 and to the flexible pipe 20. The contact portion 26 is also shown with its two parts 36, 38 oriented perpendicularly to one another, as well as the curved part 40 which is connected to the mooring 44. In addition, the mooring 44 is connected to two new flexible pipes, i.e. a second one 20' and a third one 20". These two new flexible pipes 20', 20" have respectively a second 24' and a third 24" floating portion which are substantially parallel to one another, and also to the floating portion 24 of the pipe 20. They are extended respectively by a second contact portion 26' and a third contact portion 26", which are divided respectively into a second first part 36' and a second second part 38', and into a third first part 36" and a third second part 38". The second and third first parts 36', 36" and the second and third second parts 38', 38" are respectively substantially parallel to one another. In addition, the second first 36' and second 38' parts on the one hand, and the third first 36" and second 38" parts on the other hand, are respectively separated by a second curved part 40' and a third curved part 40". In addition, the second 40' and third 40" curved parts are respectively connected to the mooring 44, and are spaced by a distance which is equivalent to the distance which separates the curved part 40 from the second curved part 40'.

The three first parts 36, 36', 36" which are substantially parallel to one another can be connected to a receipt installation, not represented. The mooring 44 is thus designed to absorb all of the tension forces which are exerted by the three floating portions 24, 24', 24".

The invention claimed is:

1. An assembly for connecting a flexible pipe to an undersea installation located toward the bottom of a marine environment, the assembly comprising:

the flexible pipe having a bottom end for connection to the undersea installation, and an opposite, surface end for connection to a surface installation at the marine environment, whereby the pipe extends between the bottom end and the surface end thereof;

the pipe including a contact portion thereof located along the pipe close to the bottom end, the contact portion being configured so as to contact the bottom of the marine environment along a length of the pipe in the vicinity of the undersea installation;

the contact portion including a curved part thereof positioned along the pipe for dividing the contact portion along the length of the pipe into a first part of the contact portion which is oriented to extend toward the bottom installation and a second part of the contact portion which links to the pipe above the contact portion along the pipe; and an anchorage including an anchorage point and a mooring extending between the curved part and the anchorage point at the bottom of the marine environment, spaced from the curved part and opposite to both the bottom end of the pipe and to the pipe above the contact portion at a location to maintain the first and second parts of the contact portion at an orientation substantially parallel to the bottom of the marine environment, and to enable the anchorage to absorb traction forces on the contact portion which are exerted by the pipe above the contact portion.

2. The connection assembly of claim 1, wherein the pipe above the contact portion includes a floating portion located along the pipe between the contact portion and the surface end of the pipe, the second part of the contact portion is connected to the floating portion of the pipes, the floating portion is configured to float above the bottom of the marine environment while the contact portion is configured to contact the bottom of the marine environment, and the floating portion extends between the bottom of the marine environment and the surface installation, wherein the floating portion exerts traction forces on the contact portion.

3. The connection assembly of claim 2, wherein the curved part has a lower surface facing away from the anchorage point and an upper surface opposite the lower surface and facing toward the anchorage point; and a mooring of the upper surface of the curved part to the anchorage point.

4. The connection assembly of claim 3, wherein the curved part is rigid.

5. The connection assembly of claim 3, wherein the curved part is moored to the anchorage point by the mooring being oriented relative to the second part of the contact portion and relative to the first part of the contact portion at angles selected between 90° and 100° and 180°.

6. The connection assembly of claim 5, wherein the mooring from the curved part to the anchorage point comprises an extensible mooring.

7. The connection assembly of claim 5, wherein the mooring is comprised of a material comprised of polymer fibers.

8. The connection assembly of claim 2, further comprising heavy modules at the contact portion configured and located to maintain the contact portion on the bottom of the marine environment.

9. The connection assembly of claim 1, wherein the curved part is between the first and second parts, and the curved part comprises first and second, opposite connection ends thereof, the first connection end is connected to the first part of the contact portion and the opposite second connection end is connected to the second part of the contact portion.

10. The connection assembly of claim 9, further comprising a respective stiffening sheath at each of the first and second connection ends of the curved part.

11. An assembly for connecting a flexible pipe to an undersea installation located toward the bottom of a marine environment, the assembly comprising:

the flexible pipe having a bottom end for connection to the undersea installation, and an opposite, surface end for connection to a surface installation at the marine environment, whereby the pipe extends between the bottom end and the surface end thereof;

the pipe including a contact portion thereof located along the pipe close to the bottom end, the contact portion being configured so as to contact the bottom of the marine environment along a length of the pipe in the vicinity of the undersea installation;

the contact portion including a curved part thereof positioned along the pipe for dividing the contact portion along the length of the pipe into a first part of the contact portion which is oriented to extend toward the bottom installation and a second part of the contact portion which links to the pipe above the contact portion along the pipe; and an anchorage point at the bottom of the marine environment, spaced from the curved part and opposite to both the bottom end of the pipe and to the pipe above the contact portion at a location to maintain the first and second parts of the contact portion at an orientation substantially parallel to the bottom of the marine environment, and to absorb traction forces on the contact portion which are exerted by the pipe above the contact portion;

a second one of the flexible pipes, the second pipe having a second contact portion;

a second curved part provided at the second contact portion defining and being between a second one of the first parts and a second one of the second parts and the second curved part is connected between the second ones of the first and second parts of the second pipe;

the mooring is connected from the anchorage point to the curved part of the first of the pipes and to the second curved part of the second of the pipes.

12. The connection assembly of claim 11, wherein the respective first and second parts of the second contact portion of the second pipe are oriented so that the first and second parts of both of the first and second contact portion pipes are substantially parallel.

* * * * *